United States Patent [19]
Senoo et al.

[11] Patent Number: 5,584,914
[45] Date of Patent: Dec. 17, 1996

[54] MEMBRANE DEAERATOR APPARATUS

[75] Inventors: Yasutoshi Senoo; Hitoshi Shiraishi; Norio Yasu; Yasuhiro Kawakami, all of Matsuyama; Yukinori Tobisaka, Tokyo-to; Yasuo Ochi, Matsuyama; Yasuhito Mitsukami, Matsuyama; Toshitaka Shigematsu, Matsuyama; Kazuhiro Tachino, Ichikawa; Yasuhiro Miyagama, Matsuyama; Kenichiro Takematsu, Hojo; Nobuaki Yanagihara, Matsuyama, all of Japan

[73] Assignees: Miura Co., Ltd; Miura Institute of Research & Development Co., Ltd., both of Ehime, Japan

[21] Appl. No.: 381,863
[22] PCT Filed: Feb. 4, 1993
[86] PCT No.: PCT/JP93/00138
 § 371 Date: Feb. 7, 1995
 § 102(e) Date: Feb. 7, 1995
[87] PCT Pub. No.: WO94/03397
 PCT Pub. Date: Feb. 17, 1994

[30] Foreign Application Priority Data

Aug. 7, 1992 [JP] Japan .................................. 4-233063
Dec. 1, 1992 [JP] Japan .................................. 4-349765

[51] Int. Cl.$^6$ .................................................. B01D 19/00
[52] U.S. Cl. .............................. 96/6; 96/7; 96/9; 55/268
[58] Field of Search ........................... 95/46, 14, 16–18, 95/23, 24; 96/6–10; 55/210, 218, 219, 267, 268, 270, 271

[56] References Cited

U.S. PATENT DOCUMENTS

| | | | |
|---|---|---|---|
| 3,442,002 | 5/1969 | Geary et al. | 96/8 X |
| 3,591,946 | 7/1971 | Loe | 96/175 |
| 3,751,879 | 8/1973 | Allington | 96/6 X |
| 4,729,773 | 3/1988 | Shirato et al. | 96/6 |
| 4,986,837 | 1/1991 | Shibata | 96/6 |
| 5,069,686 | 12/1991 | Baker et al. | 95/47 |
| 5,129,921 | 7/1992 | Baker et al. | 95/45 |
| 5,194,074 | 3/1993 | Hauk | 96/10 X |
| 5,205,844 | 4/1993 | Morikawa | 96/6 |

FOREIGN PATENT DOCUMENTS

| | | | |
|---|---|---|---|
| 49-098765 | 9/1974 | Japan . | |
| 51-28261 | 3/1976 | Japan . | |
| 02-303587 | 12/1990 | Japan . | |
| 08-0322792 | 2/1991 | Japan . | |
| 03-059004 | 6/1991 | Japan . | |
| 03-154601 | 7/1991 | Japan . | |
| 03-224602 | 10/1991 | Japan | 96/6 |
| 4-4003 | 1/1992 | Japan . | |
| 04-004089 | 1/1992 | Japan | 96/6 |
| 04-004090 | 1/1992 | Japan | 96/6 |
| 04-014188 | 2/1992 | Japan . | |
| 05-049808 | 3/1993 | Japan | 96/6 |
| 05-084474 | 4/1993 | Japan | 96/6 |
| 06-121903 | 5/1994 | Japan | 96/6 |

*Primary Examiner*—Robert Spitzer
*Attorney, Agent, or Firm*—Birch, Stewart, Kolasch & Birch, LLP

[57] ABSTRACT

The membrane deaerator according to the present invention includes a plurality of membrane deaerator modules and a water sealed vacuum pump connected thereto. These modules are series-connected between a raw water supply line and a deaeration water supply line. A first vacuum pump is connected to a first deaerator module via a deaeration line, and a second vacuum pump is connected to a second deaerator module via the deaeration line. These vacuum pumps are each provided with a seal water supply line which is used to send the raw water introduced from the water supply line thereinto as seal water to each of the first and second vacuum pumps. A discharge line for the second vacuum pump is connected to the deaeration line for the first vacuum pump. In the membrane deaerator thus formed, the deaeration performance is improved greatly, and a deaeration with dissolved oxygen concentration of several PPB can be carried out.

11 Claims, 10 Drawing Sheets

| | (A) | (B) |
|---|---|---|
| RAW WATER D.O. | 8ppm | 8ppm |
| PRECEDING-STAGE D.O. /VACUUM PRESSURE | 20ppb/21torr | 120ppb/32torr |
| SUCCEEDING-STAGE D.O. /VACUUM PRESSURE | 0.5ppb/19torr | 10ppb/26torr |

QUANTITY OF DEAERATION WATER USED

MEMBRANE DEAERATOR APPARATUS

TECHNICAL FIELD

The present invention relates to improvement in membrane deaerators for removing dissolved gases in raw water. The deaerator of the present invention is applied to such cooling and heating equipment as boilers, water heaters, and ice makers, or to water supply systems of buildings, food processors, and washing equipment for various parts. The deaerator of the present invention is suitable particularly for washing equipment for electronic parts to which a lower dissolved oxygen concentration level is demanded.

BACKGROUND ART

As is well known, the water supply line to cooling and heating equipment such as boilers has various types of deaeration devices (deoxidizing devices) incorporated therein for the purpose of preventing the interior of the device from corrosion. Those deaeration devices are applausively used in recent years as a countermeasure for the generation of red water in the water supply tubes in architectures such as buildings and apartments.

Also, in recent years, washing systems using deaerated water (especially, deoxidized water) have been receiving attention as a result of seeking a washing method without using CFCs (chlorofluorocarbons) in order to prevent the ozone layer from being damaged by CFCs.

A conventional membrane deaerator for the aforementioned use such as shown in FIG. 19 is known. This deaerator comprises a deaerator module (1') and a flow switch (6') provided in a water supply line (3'), a constant flow rate valve (11'), a seal-water use solenoid valve (12') provided in a seal water supply line (9') between the water supply line (3') and a water sealed vacuum pump (7'), and an evacuation-use solenoid valve (13') provided in a vacuum deaeration line (10') between the deaerator module (1') and the water sealed vacuum pump (7'). Therefore, when water (pure water, tap water, well water, and other industrial water) is supplied to the water supply line (3'), the flow switch (6') is activated to drive the water sealed vacuum pump (7') while the two solenoid valves (12'), (13') are opened, whereby a vacuum deaeration process is performed. Then, with the water supply off, the water sealed vacuum pump (7') is stopped, where the two solenoid valves (12'), (13') are closed.

The deaerator with this constitution is capable of processing at normal temperature advantageously. However, its deaeration level is around 0.5 PPM.

Known deaeration systems using deaerator modules include a "deaerator" described in Japanese Patent Laid-Open Publication No. SHO 51-28261 and another "deaerator" described in Japanese Patent Application No. HEI 4-4003. Several other similar inventions have also been proposed.

Otherwise, a deaeration system (not shown) using a deaeration tower is adopted for production of industrial water in the electronics field. This system, however, has difficulty in supplying processed water of a deaeration level (deoxidizing level) below 10 PPB that is required for washing electronic parts such as recent years' LSIs.

As an effective countermeasure for problems in practical use of the aforementioned conventional deaeration system, it could be conceived that the deaeration performance attributable to the vacuum pump is enhanced by improving the deaeration system using a hollow-fiber module as the deaeration means. To achieve this, the following technical problems need to be solved.

With a system using deaerator modules, for example as for the dissolved oxygen concentration of processed water, if the outside atmospheric pressure of the hollow-fiber membrane within the deaerator module is 30 torr (partial pressure of water vapor: 17.5 torr), then an oxygen concentration of about 8 PPM in raw water can be reduced to 0.5 PPM (at 20° C.). However, in order to obtain a dissolved oxygen concentration of 10 PPB or less, the about 8 PPM oxygen in the raw water must be sucked up in a vacuum state of 18 torr (including partial pressure of water vapor). For this purpose, a water sealed vacuum pump having a capacity about ten times larger than that conventionally used is necessitated. Unfortunately, because water sealed vacuum pumps of such large capacities are not manufactured in general, it is actually difficult to reduce the dissolved oxygen concentration to 10 PPB or less.

Therefore, an object of the present invention is to provide an improved membrane deaeration system which is capable of reducing the dissolved oxygen concentration of raw water to 10 PPB or less using a general, relatively small (commercially available) water sealed vacuum pump.

One aspect of the present invention for achieving the above object relates to a construction of the membrane deaerator improved in its deaeration performance by a combination of deaerator modules and vacuum pumps.

Another aspect of the present invention relates to a deaeration system devised so as to enhance its deaeration effect by cooling the seal water for the water sealed vacuum pump or by heating the raw water.

A further aspect of the present invention relates to an embodiment of using a circulation line for circulating the seal water through a vacuum pump as well as to a method of using the same.

A yet further aspect of the present invention relates to a deaerator devised so as to enhance the operating efficiency of the whole system by integrally controlling a plurality of deaeration systems.

The other aspects of the present invention relate to improvements of the individual components according to combinations of hollow-fiber modules and water sealed vacuum pumps and will be described herein in association with the following embodiments of the present invention.

SUMMARY OF THE INVENTION

The membrane deaerator according to the present invention, including many embodiments and modifications based on the combination of deaerator modules and vacuum pumps, can typically be characterized by the arrangement and connected condition of a plurality of membrane deaerator modules and a water sealed vacuum pump connected thereto.

These modules are series-connected between a raw water supply line and a deaeration water supply line. A first vacuum pump is connected to the first deaerator module via a deaeration line, and a second vacuum pump is connected to the second deaerator module via a deaeration line. These vacuum pumps are each provided with a seal water supply line which is used to send the raw water introduced from the water supply line thereinto as seal water to each of the first and second vacuum pumps. A discharge line for the second vacuum pump is connected to the deaeration line for the first vacuum pump so that discharge water from the second vacuum pump will be discharged from the discharge line through the first vacuum pump.

In the membrane deaerator thus formed, the deaeration performance is improved greatly, and a deaeration with dissolved oxygen concentration of several PPB can be carried out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
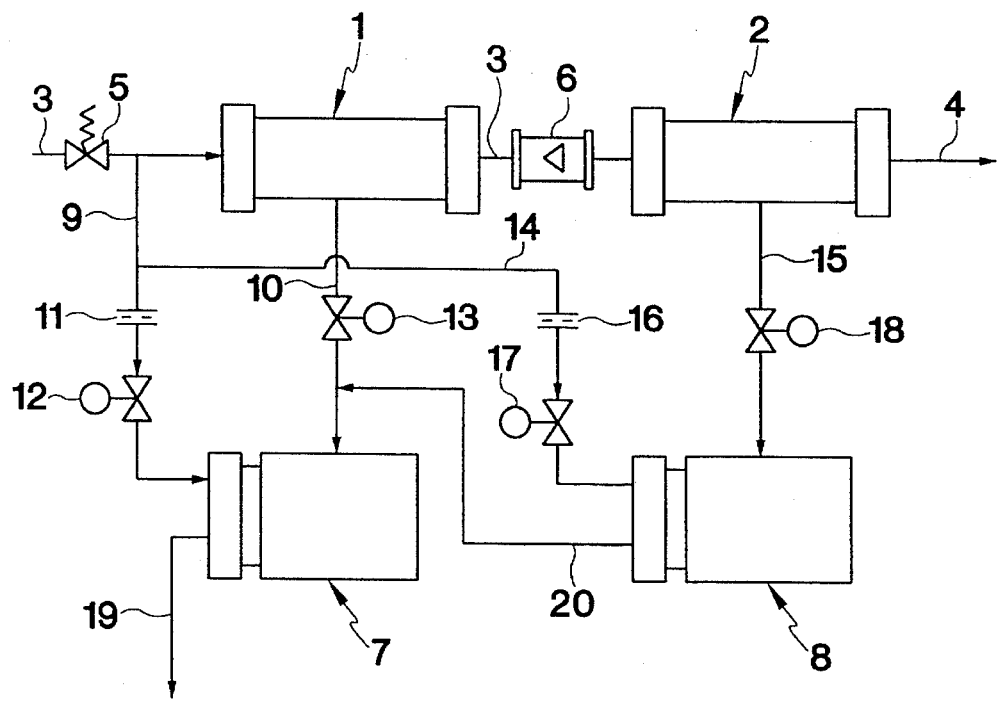
FIG. 1 is a piping system diagram showing an embodiment of the deaerator according to the present invention, wherein a plurality of deaerator modules and vacuum pumps are combined.

FIG. 1 shows a preferred embodiment of the present invention. In this embodiment, two deaerator modules (1), (2) coupled to each other in series are used.

Reference numeral (3) denotes a water supply line for introducing raw water, and (4) denotes a supply line for deaeration water. To these lines, a pressure reducing valve (5) and a flow switch (6) are connected at positions shown in the figure. The pressure reducing valve (5) serves to prevent the first-stage (preceding-stage) and the second-stage (succeeding-stage) deaerator modules (1), (2) from receiving a supply water pressure higher than a specified level, with a view to protecting those modules from damage.

The first-stage deaerator module (1) and the second-stage deaerator module (2) are preferably composed of a multiplicity of hollow-fiber membranes. In this arrangement, raw water is passed through the interior of the membranes, so that their outside is evacuated to a vacuum. Thus, the deaerator modules (1) and (2) act to remove the dissolved gases in the raw water in the process during which the water passes inside the hollow-fiber membranes. The flow switch (6) is connected to the outlet side of the first-stage deaerator module (1) in the water supply line (3). When the flow switch (6) detects the flow of water that has passed through the first-stage deaerator module (1) in the water supply line (3), it outputs an electrical signal.

On the other hand, water sealed vacuum pumps (7), (8) are applied to the first-stage and second-stage deaerator modules (1), (2) as a means for vacuum deaeration.

The first-stage (preceding-stage) water sealed vacuum pump (7) is connected to the water supply line (3) via a seal water supply line (9) while it is connected to the first-stage deaerator module (1) via a vacuum deaeration line (10). The first-stage water sealed vacuum pump (7) is electrically connected to the flow switch (6) so as to operate in response to an output signal of the flow switch (6) (the electrical control circuit is not shown in FIG. 1). The seal water supply line (9) has a constant flow rate valve (11) and a first solenoid valve (12) incorporated therein. Also, a second solenoid valve (13) is incorporated in the vacuum deaeration line (10). These solenoid valves (12), (13) are electrically connected to the flow switch (6). When the flow switch (6) detects the flow of water, the solenoid valves will be opened in response to the resulting detection signal.

The second-stage (succeeding-stage) water sealed vacuum pump (8) is connected to the water supply line (3) via a second-stage seal water supply line (14) branched at an intermediate point of the seal water supply line (9), and is further connected to the second-stage deaerator module (2) via a vacuum deaeration line (15). The second-stage water sealed vacuum pump (8), which is electrically connected to the flow switch (6), operates in response to an output signal of this flow switch.

The second-stage seal water supply line (14) has a constant flow rate valve (16) and a third solenoid valve (17) incorporated therein. Also, a fourth solenoid valve (18) is incorporated in the vacuum deaeration line (15) and is electrically connected to the flow switch (6) together with the third solenoid valve (17). Thus, when the flow switch (6) detects the flow of water, the solenoid valves will be opened in response to the resulting detection signal.

A discharge line (20) of the second-stage water sealed vacuum pump (8) communicates with the vacuum deaeration line (10) of the first-stage water sealed vacuum pump (7). This arrangement allows the exhaust (including drain) of the first-stage water sealed vacuum pump (7) as well as the exhaust (including drain) of the second-stage water sealed vacuum pump (8) to be discharged to the outside through the first-stage discharge line (19).

The second-stage water sealed vacuum pump (8) in the system as shown in the figure may be of the same capacity as the first-stage water sealed vacuum pump (7).

In the above embodiment, on a condition that the concentration of dissolved gases, for example dissolved oxygen, of raw water at the outlet of the first-stage deaerator module (1) has been deaerated from about 8 PPM to about 0.5 PPM, even if the outside atmospheric pressure of the hollow-fiber membrane in the second-stage deaerator module (2) is made less than 1 torr, which is one tenth of that of the first-stage side, the volume of suction by the second-stage vacuum pump is generally equal to that by the first-stage vacuum pump. Accordingly, the vacuum pump does not need to be of specially large capacity, but may be used in the form that two common, small vacuum pumps are coupled together. Still, if the exhaust of the second-stage water sealed vacuum pump (8) is discharged directly into the air, the pressure ratio (about 1000 times) would be an excessively large one. Therefore, it is more advantageous that the exhaust is discharged to the suction port of the first-stage vacuum pump. Although this results in an about 5% increase in the amount of processing required for the first-stage vacuum pump, this is within the processible range, causing no problems.

The two-stage system deaerator in a series connection as described above is now described with respect to its operation.

When the raw water, after passing over the pressure reducing valve (5) in the water supply line (3), has passed through the first-stage deaerator module (1), the flow switch (6) is actuated. In response to the resulting detection signal, the first to fourth solenoid valves (12), (13), (17), (18) are opened, while the first-stage water sealed vacuum pump (7) and the second-stage water sealed vacuum pump (8) are driven. As a result, the first-stage deaerator module (1) comes to communicate with the first-stage water sealed vacuum pump (7) via the vacuum deaeration line (10), where it is evacuated. The exhaust gas resulting from the evacuation and the drain water derived from the seal water in the pump are discharged through the first-stage discharge passage or a discharge line (19).

For the discharge process, the second-stage deaerator module (2), which is connected in series to the first-stage deaerator module (1) via the water supply line (3), takes in water processed to a dissolved oxygen concentration of 0.5 PPM by the first-stage deaerator module (1). The second-stage deaerator module (2) further deaerates this water under a high vacuum (below 1 torr) to a processed water with dissolved oxygen concentration 0.1 PPM or less. The second-stage deaerator module (2) in this process communicates with the second-stage water sealed vacuum pump (8) via the vacuum deaeration line (15), where it has been evacuated like the above. The exhaust gas resulting from the evacuation and the drain water derived from the seal water in the pump pass inside the pump through the suction port of the first-stage water sealed vacuum pump (7) via the discharge line (20), and are discharged out through the discharge line (19).

Figure 2:
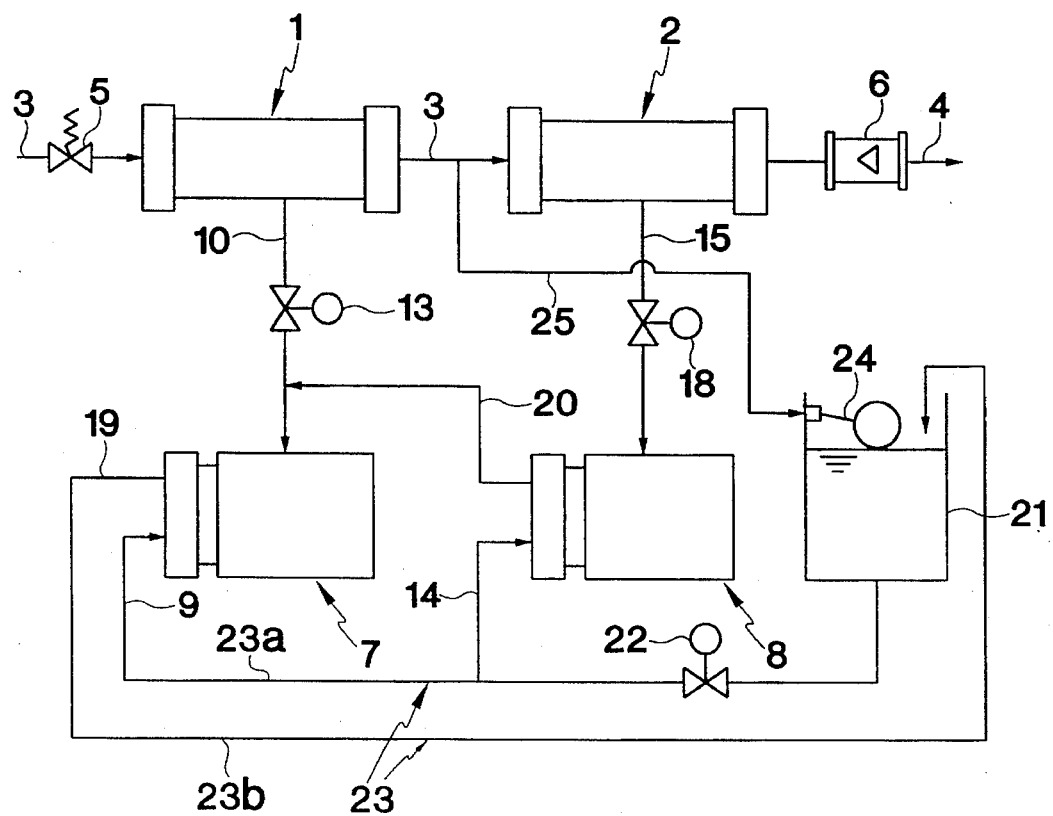
FIG. 2 is a similar diagram showing another embodiment provided with a circulation line of seal water for the vacuum pumps.

FIG. 2 shows another embodiment in which a circulation line (23) including a water reservoir (21) and a solenoid valve (22) is provided so that the drain water of the vacuum pumps in the embodiment of FIG. 1 can be recycled.

The embodiment of FIG. 2 differs from that of FIG. 1, in that the position where the flow switch (6) is provided is changed and that neither the constant flow rate valves (11), (16) nor the solenoid valves (12), (17) are provided. However, the two embodiments are similar to each other in their basic arrangement, and therefore like components are designated by like numerals.

The aforementioned circulation line (23) comprises a feed line (23a) for feeding the water of the water reservoir (21) located at a predetermined height level to the first-stage and second-stage vacuum pumps (7), (8), and a return line (23b) for returning drain water of the vacuum pumps to the water reservoir (21). Therefore, under a condition that the solenoid valve (22) is opened, the water of the water reservoir (21) flows into the first-stage vacuum pump (7) through the seal water supply line (9) via the feed line (23a), and to the second-stage vacuum pump (8) through another seal water supply line (14). Meanwhile, the water discharged out of the discharge lines (19), (20) from the first-stage and second-stage vacuum pumps (7), (8), respectively, flows back into the water reservoir (21) via the return line (23b).

In connection to such an arrangement of the circulation line (23), if a water supply means (24) such as a ball tap is provided in the water reservoir (21) and if, for example, the water supply line (3) between the first-stage deaerator module (1) and the second-stage deaerator module (2) is connected to a water supply line (25), then deaeration water that has passed through the first-stage deaerator module (1) can be introduced into the circulation line (23).

With this arrangement, deaeration water as seal water is supplied to the two-stage vacuum pumps (7), (8). When the water is used, dissolved gases in the seal water are suppressed from diffusing inside the water sealed vacuum pumps. As a result, the gas partial pressure inside the deaerator modules (1), (2) can be further lowered so that the dissolved oxygen concentration in the supply water can be further reduced, advantageously.

Needless to say, the inlet port for the supply water which is taken in via the water supply line (25) may be changed in its position to the downstream side of the second-stage deaerator module (2), i.e., onto the deaeration water supply line (4), in terms of enhancement of the deaeration effect.

Figure 3:
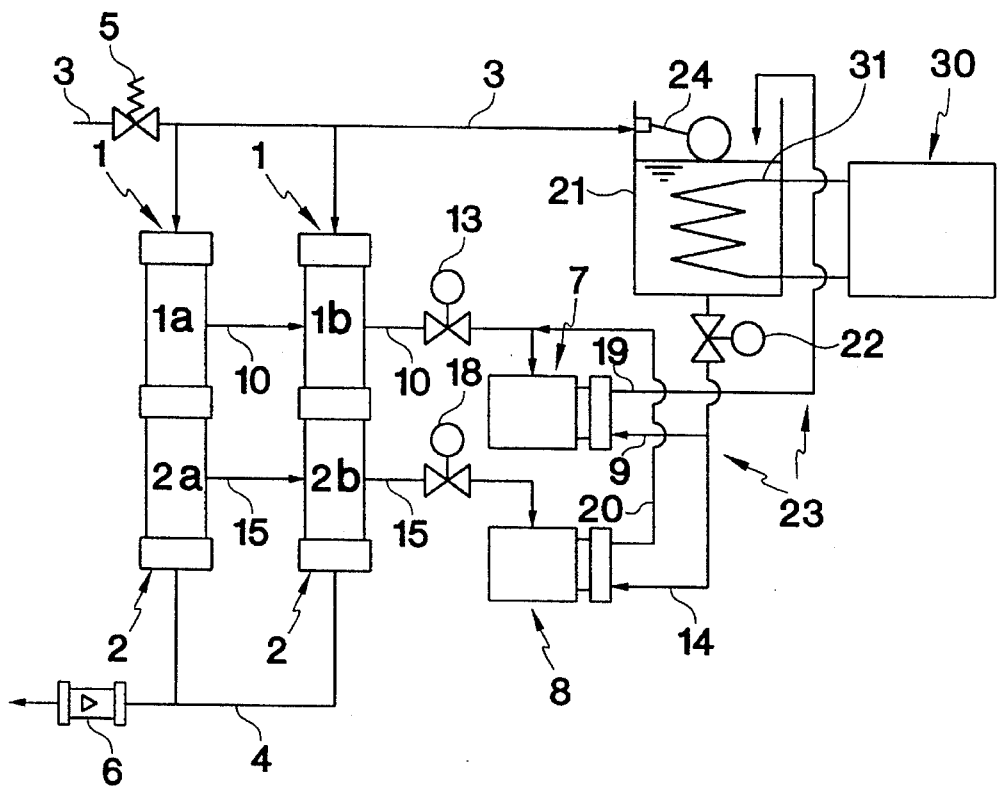
FIG. 3 is a similar diagram showing another modification provided with a cooling means for the seal water.
Figure 4:
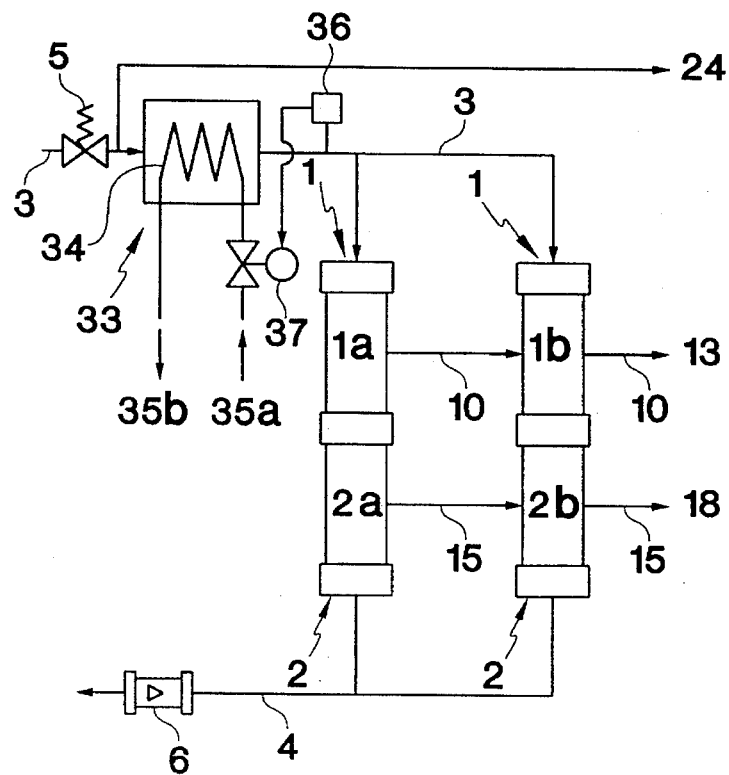
FIG. 4 is a similar diagram showing still another modification provided with a heating means for the raw water to be introduced into the deaerator modules.

FIGS. 3 and 4 show embodiments including other modified arrangements for the membrane type deaerator.

Of these modifications, the embodiment of FIG. 3 comprises a cooling means (30) for cooling seal water to be introduced into the vacuum pumps, whereas the embodiment of FIG. 4 comprises a heating means (33) for heating raw water in the water supply line (3). In FIG. 4, although a portion generally corresponding to the right half of FIG. 3 is omitted, reference numerals (24), (13), and (18) in FIG. 4 represent that their corresponding components are connected to a water supply means (24), a solenoid valve (13), and a solenoid valve (18), respectively, which are similar to those in FIG. 3.

Referring to FIG. 3 in further detail, in this modification, the first-stage deaerator modules (1a), (1b) and the second-stage deaerator modules (2a), (2b) are connected in series to form one unit, and two units of the series of modules are provided in the water supply line (3) in parallel. Also, the first-stage deaerator module (1) is connected to the aforementioned solenoid valve (13) through the vacuum deaeration line (10), while the second-stage deaerator module (2) is connected to the aforementioned solenoid valve (18) through the vacuum deaeration line (15).

The cooling means (30) in the example of the figure has a heat exchanger (31) installed in the water reservoir (21), which serves as a cold water reservoir.

With the above arrangement, when the flow switch (6) is actuated by water flowing into the water supply line (3), the first-stage and second-stage vacuum pumps (7), (8) are put into operation upon reception of an output signal of the flow switch (6) while the solenoid valves (13), (18), and (22) are opened. As a result, dissolved oxygen in the raw water is deaerated through the vacuum deaeration lines (10), (15). Then, when the supply water is stopped, the vacuum pumps (7), (8) are stopped and the solenoid valves are closed.

In the process in which such operations are carried out, water cooled preferably to about 5° C. by the cooling means (30) flows as seal water into the vacuum pumps (7), (8) via the circulation line (23) for supplying seal water. As a result, the partial pressure of water vapor in the vacuum pumps lowers. Accordingly, the outside pressure of the membrane lowers so that a higher degree of vacuum can be obtained. In addition, by the arrangement that the first deaerator module (1) and the second deaerator module (2) are connected to each other in series and that the discharge line (20) of the water sealed vacuum pump (8) is connected to the vacuum pump (7), the degree of vacuum can be further elevated, so that the dissolved oxygen can be reduced to several PPB. That is, the first deaerator module (1) makes the dissolved oxygen in the raw water reduced from 8 PPM to 0.5 PPM. The resulting water passes through the second deaerator module (2) while the discharge-side pressure of the water sealed vacuum pump (7) becomes a pressure lower than the atmospheric pressure (about 10 torr), whereby a very high degree of vacuum (about 1 torr) can be obtained even with a commercially available water sealed vacuum pump of relatively small capacity.

The drain water (cold water) from the water sealed vacuum pump (7) may also be discarded as it is, without being recycled. However, recycling the drain water allows not only an effective use of heat but also a reduction in the capacity of the cooling means (30) (to about 1/6), advantageously. Further, since the seal water in the circulation line (23) is circulated by the discharging force of the water sealed vacuum pumps, there is no need of additional driving sources such as a circulation pump.

Referring next to the modification of FIG. 4 in more detail, a heating means (33), which may be in the form of a heat exchanger (34), is provided at an upstream position in this example. This heating means heats the raw water to reduce the solubility of dissolved gases in the deoxidizing modules, thereby increasing the rate of deoxidization. A temperature sensor (36) connected to the water supply line (3) controls an open/close valve (37) according to the temperature of the supply water after being heated, i.e., the raw water, so that the heating medium (not shown) is made to flow as indicated by the arrows (35a), (35b). In addition, components in FIG. 4 indicated by the same reference numerals as in FIG. 3 are as described before and thus omitted in description.

Therefore, if the temperature of the raw water is detected by the temperature sensor (36) and the supply of the heating medium to the heating means (33) is controlled by the operation of the open/close valve (37) so that the temperature of the supply water is maintained within a specified range (about 20° to 30° C.), then water having a constantly stable dissolved oxygen concentration can be supplied.

It is also possible to use a combination of the heating means (33) and the cooling means (30) in the circulation line (23). In this case, the quantity of deoxidization can be further increased.

Figure 5:
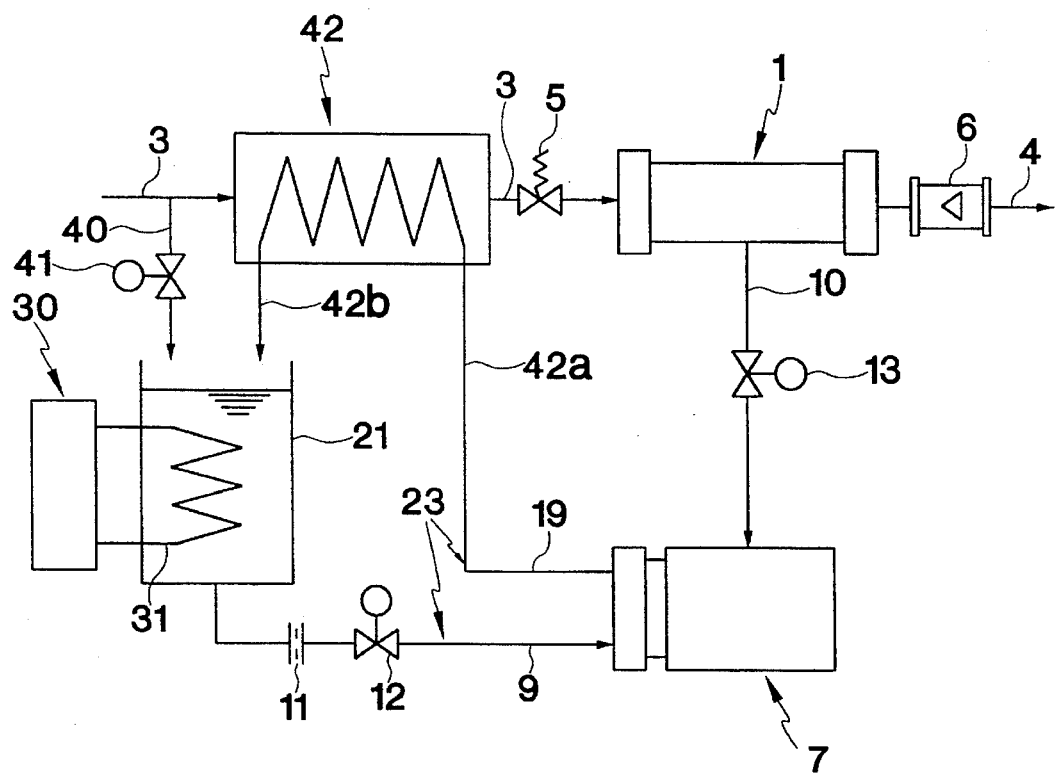
FIG. 5 is a similar diagram showing another embodiment of the cooling system for the seal water.

FIG. 5 shows a preferred embodiment designed to economically cool the seal water fed to the vacuum pumps.

The seal water supply system of this embodiment comprises a supply water takeout line (40) branched from the water supply line (3), a solenoid valve (41) inserted in the line, a water reservoir (21) similar to that used in FIGS. 2 and 3, a seal water supply line (9), a vacuum pump (7) and its discharge line (19), a heat exchanger inlet (42a) connected to the line, and a heat exchanger (42) and its outlet (42b). The heat exchanger (42) has the water supply line (3) connected to its both ends so that heat exchange is accomplished between the raw water and the drain water (used seal water) of the vacuum pump (7).

Accordingly, the raw water is heat-exchanged with the drain water derived from the vacuum pump (7) in the process in which the raw water flows through the water supply line (3) to the deaerator module (1). Thereafter, the raw water enters the deaerator module (1), while the drain water flows into the water reservoir (21). The cooling means (30), which is driven so that the water in the water reservoir (21) is maintained at a specified temperature level, can be reduced in capacity by the action of the heat exchanger (42). Still, the drain water from the vacuum pump (7) can be used for recycle without being discarded.

Figure 6:
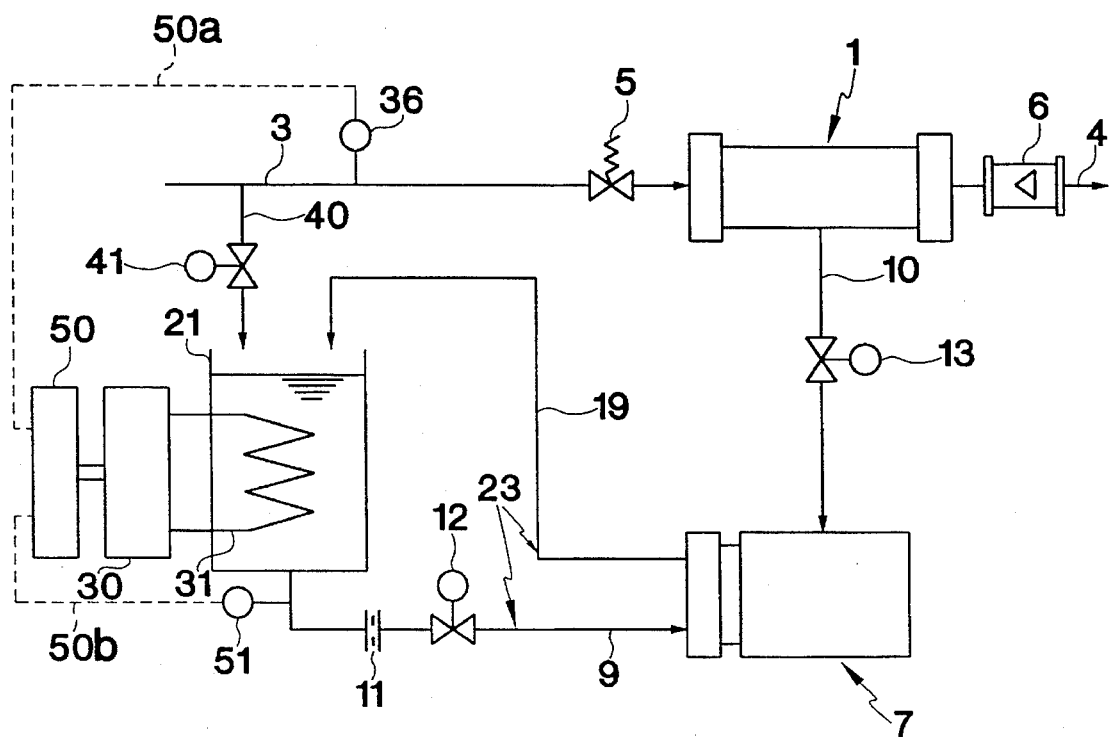
FIG. 6 is a similar diagram showing a preferred seal water supply system arranged by taking into account the temperature of the raw water.

FIG. 6 shows yet another embodiment of the seal water supply system.

This system has been developed in view of the fact that there is a great change in the temperature of raw water between summer and winter. The system is so devised as to be able to make constant the dissolved oxygen level of processed deaeration water under such a temperature condition. It is noted that, also in the figure, the same components as in the foregoing embodiment are designated by like numerals.

Reference numeral (51) in FIG. 6 denotes a raw water temperature sensor also denoted by a reference numeral (36). The seal water temperature sensor (51) is provided in a seal water supply line denoted by a reference numeral (9). Those two sensors (36), (51) are electrically connected to a control box denoted by (50) via signal lines (lead wires) (50a), (50b), respectively.

Accordingly, when the temperature sensor (36) has detected the temperature of the raw water during operation, the resulting information is fed to the control box (50) via the signal line (50a). Simultaneously with this, the temperature of the seal water flowing through the seal water supply line (9) from the water reservoir (21) is detected by the other temperature sensor (51), and the resulting signal is fed to the control box (50) via the signal line (50b). The control box (50) discriminates those signals, acting to drive the cooling means (30) so that the water is cooled to a specified temperature of the seal water in the water reservoir (21). By this action, it becomes possible to lower the partial pressure of water vapor in the water sealed vacuum pump (7) and thereby evacuate the vacuum pump (7) to an even lower pressure. Thus, the dissolved oxygen concentration of processed water can be controlled to a specified concentration.

Figure 7:
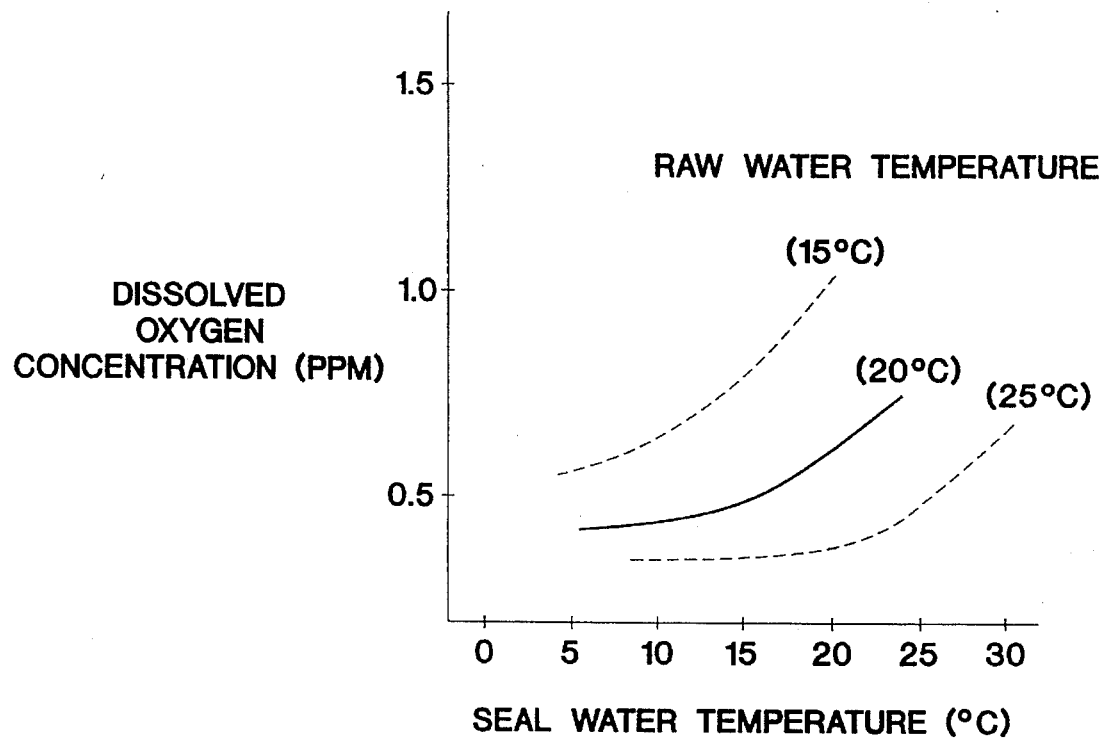
FIG. 7 is a graph showing the correlation among the raw water temperature, seal water temperature, and dissolved oxygen concentration.

In the above process, data relating to raw water temperature and seal water temperature such as shown in FIG. 7 is utilized. FIG. 7 represents variation in dissolved oxygen concentration with varying raw water temperature when the vertical and horizontal axes represent the dissolved oxygen concentration and the seal water temperature, respectively. Inside the control box (50), the processing of comparison between the data and the aforementioned two signals is normally being executed during the system operation.

Figure 8:
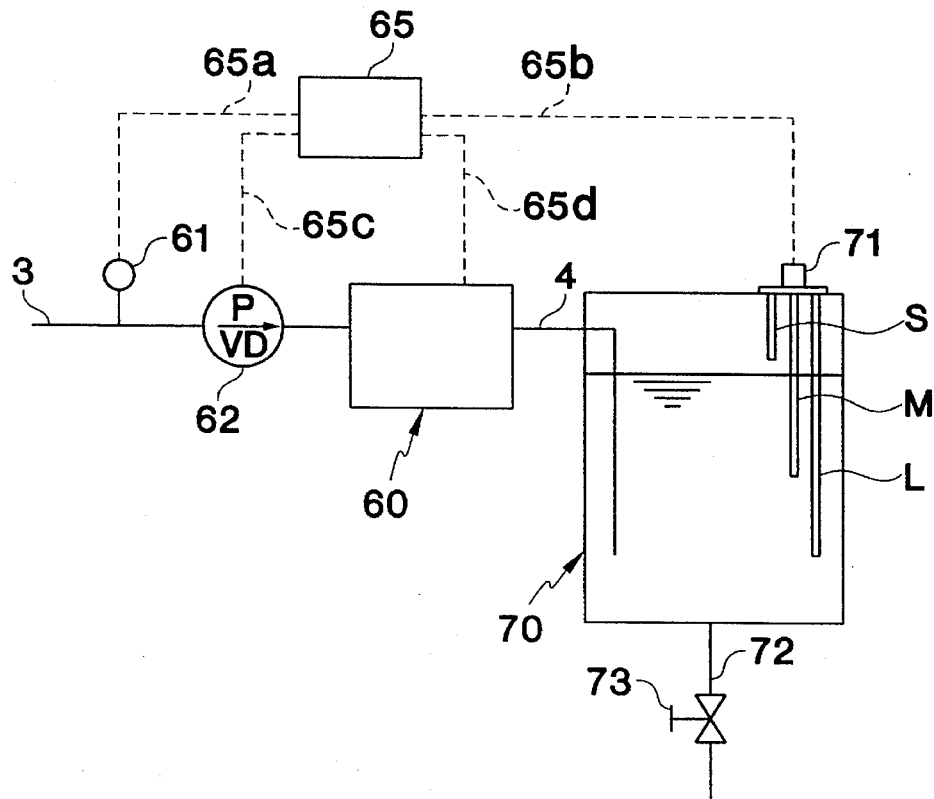
FIG. 8 is a piping system diagram showing still another seal water supply system arranged by taking into account the temperature of the raw water.

FIG. 8 shows an embodiment which is devised in still another way for coping with the temperature of supply water (raw water) that will vary depending on surrounding environments as well as with temperature variation due to season.

Referring to FIG. 8, reference numeral (60) denotes a membrane deaeration system, generally representing the component part of the deaerator module or the vacuum pump or the like. A temperature sensor (61) and a feed pump (62) are connected to the system in the water supply line (3) on the upstream side. Also, a deaeration water supply tank (70) provided with a water level detector (71) composed of water level probes (S), (M), (L) is connected to the deaeration water supply line (4) on the downstream side. Reference numeral (65) denotes a control box, which is provided with a signal line (65a) for the temperature sensor (61), a signal line (65b) for the water level detector (71), a signal line (65c) for the feed pump (62), and a signal line (65d) for the membrane deaeration system (60). Reference numeral (72) denotes a deaeration water takeout line connected to the bottom of the deaeration water supply tank (70), and (73) denotes a deaeration water takeout valve.

Figure 9:
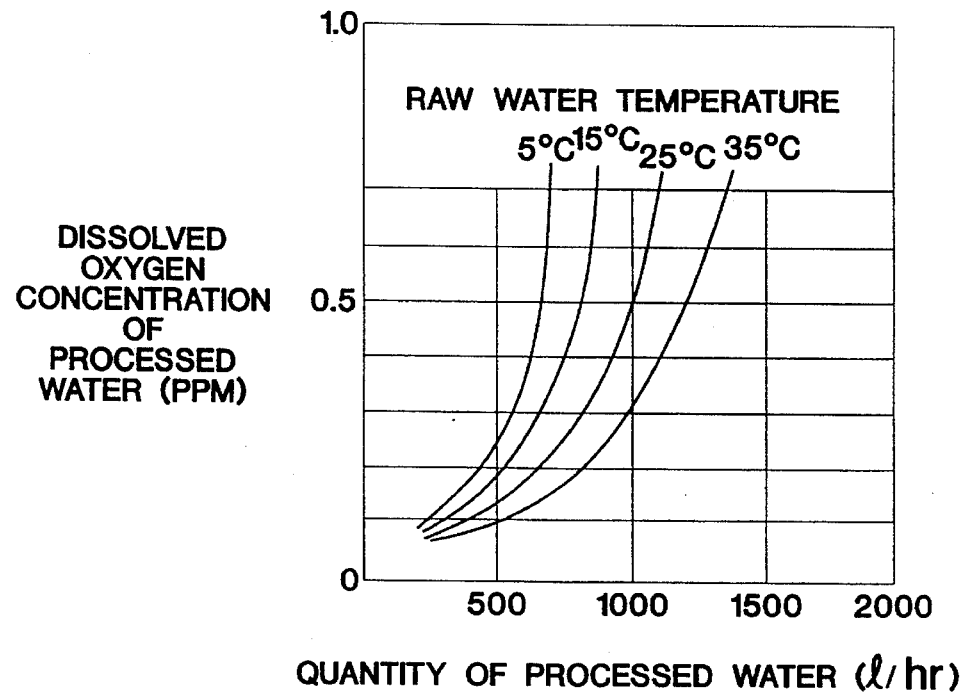
FIG. 9 is a graph showing the relation between dissolved oxygen concentration of processed water and quantity of processed water, in correspondence to the level of the raw water temperature.
Figure 10:
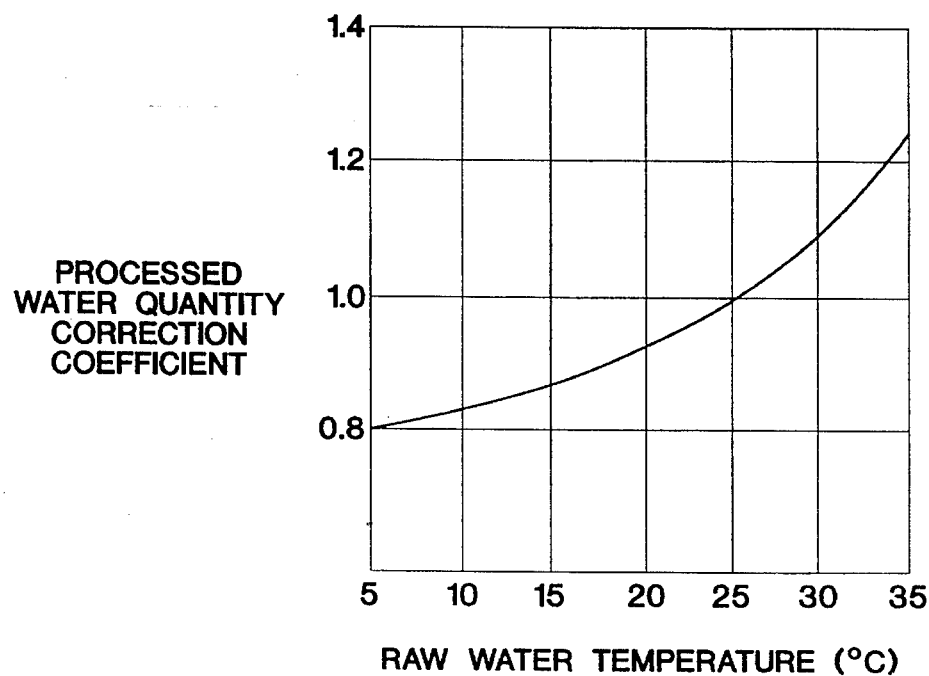
FIG. 10 is a graph showing the relation between processed water quantity correction coefficient and raw water temperature, with the dissolved oxygen concentration of 0.5 PPM maintained.

With the above arrangement, when the feed pump (62) driven, raw water flows through the water supply line (3). Then, the temperature sensor (61) detects the temperature of the raw water, outputting an electrical signal to the control box (65) via the signal line (65c). In this process, the control box discriminates the raw water temperature signal derived from the temperature sensor (61), and acts to control the flow rate of the feed pump (62) based on previously set relational values between raw water temperature and quantity of processed water. FIGS. 9 and 10 are graphs representing data to be referenced for the control. The former graph allows the calculation of a relation between dissolved oxygen concentration of processed water and quantity of processed water which relation corresponds to the level of raw water temperature. The latter graph allows the arithmetic operation of a relation between processed water quantity correction coefficient and raw water temperature which relation is to maintain the dissolved oxygen concentration of 0.5 PPM. As a result, the quantity of water to be processed through the deaeration system (60) is calculated, so that the raw water of the resulting water quantity is circulated through the water supply line (3), flowing into the deaeration water supply tank (70).

When the deaeration water (processed water) comes into contact with the upper-level electrode probe (S) of the deaeration water supply tank (70), the signal is transmitted to the control box (65) through the signal line (65b). Then, the control box acts to stop the feed pump (62) and the deaeration system (60).

Deaeration water for the equipment that needs deaeration water is taken out from the takeout line (72) via the takeout valve (73). If the water level within the deaeration water supply tank (70) falls below the mid-level electrode probe (M), the feed pump (62) and the deaeration system (60) are re-driven. If the amount of deaeration water used increases such that the water level within the tank falls below the lower-level electrode probe L temporarily, the feed pump (62) is operated at a maximum flow rate by the control box (65) irrespectively of the temperature of the raw water, whereby emergency water supply is effected. Subsequently, when the water level has reached the lower-level electrode probe L, the system returns to normal operation.

Figure 11:
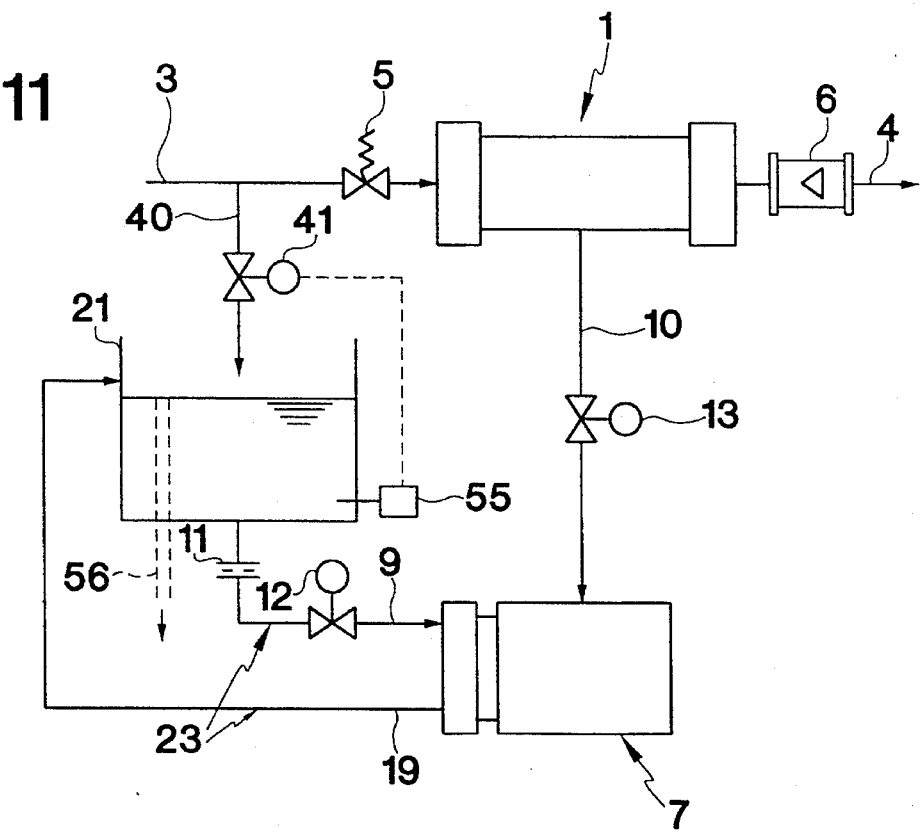
FIG. 11 is a piping system diagram showing a relatively simple example of the arrangement of the circulation line for the seal water.

FIG. 11 shows another embodiment which is so devised that the temperature of water within the water reservoir (21) for seal water can be controlled to be constant by a relatively simple arrangement.

This embodiment comprises a thermostat means (55) which is actuated when the temperature of water within the water reservoir (21) exceeds a specified level (30° C.), and which acts to open the solenoid valve (41) into which the branch line (40) of the water supply line (3) is inserted (its detailed arrangement is omitted). Therefore, when the water temperature becomes above a specified level, the raw water is added into the water reservoir (21) through the branch line (40), so that the temperature of water inside the water reservoir (21) is controlled to the specified level.

If the water within the water reservoir (21) overflows as a result of repetition of the above control process, an overflow line (56) (indicated by dotted line in the figure) opened at a desired horizontal height position may be provided so that water of relatively high temperature in the upper portion within the tank can be taken out. It is also preferable that an extended end of this overflow line is introduced to a sub tank (not shown), and that the water is allowed to radiate its heat naturally here and then returned back to the water reservoir (21).

Figure 12:
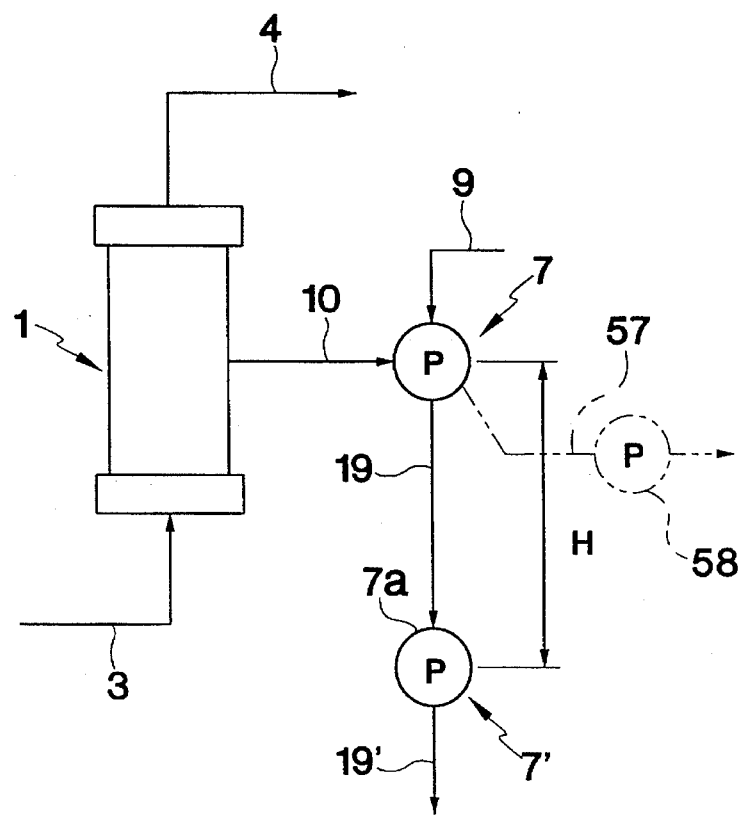
FIG. 12 is a similar diagram showing another embodiment in which the arrangement of the deaerator modules and the vacuum pumps is modified.
Figures 13, 14:
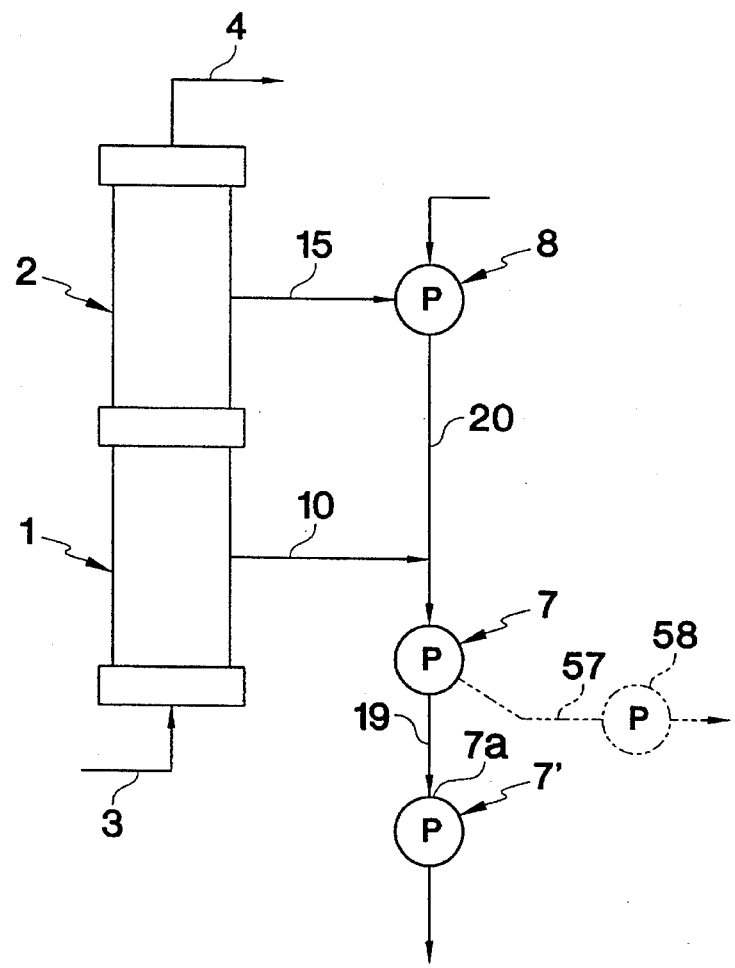
FIG. 13 is a similar diagram showing another embodiment in which the arrangement of the deaerator modules and the vacuum pumps is further modified.
FIG. 14 is a table in which the dissolved oxygen concentration of processed water is compared between a system having the sub vacuum pump used in the embodiments of FIGS. 12 and 13 and another system having no such sub vacuum pump.

Next, FIGS. 12 and 13 are explained below.

These figures disclose embodiments in which the deaeration performance is further enhanced by improvement in the arrangement of the deaerator modules and the vacuum pumps.

In more detail, in the example of FIG. 12, two water sealed vacuum pumps (7), (7') are linked with the deaerator module (1) and the discharge line (19) of the main vacuum pump (7) is connected to a deaeration port or suction port (7a) of the sub vacuum pump (7').

According to this configuration, the sub vacuum pump (7') sucks primarily gas discharged from the preceding-stage main vacuum pump (7). Therefore, the load on the sub vacuum pump (7') becomes substantially small, so that the degree of vacuum of the main vacuum pump (7) is elevated. That is, without the sub vacuum pump (7'), the main vacuum pump (7) would achieve an exhaust of vacuum pressure from 30 torr to 760 torr, for example. In contrast, with the sub vacuum pump (7') provided, the vacuum pressure of the main vacuum pump (7) lowers to 25 torr while the discharge pressure becomes 36 torr, so that the sub vacuum pump (7') performs a compression from 36 torr to 760 torr. In this case, the exhaust of the main vacuum pump (7) is compressed from 25 torr to 36 torr, so that the amount of exhaust of the sub vacuum pump (7') is reduced to a substantial extent.

As described above, the vacuum pump has a characteristic that as the amount of exhaust decreases, the compression ratio increases conversely. Therefore, in the system of the present invention in which two vacuum pumps are arranged in series, the reached degree of vacuum of the preceding-stage main vacuum pump (7) is improved substantially.

In connection to the arrangement of the main vacuum pump (7) and the sub vacuum pump (7'), it is also effective to set the height position of these vacuum pumps so that the main vacuum pump (7) is higher than the sub vacuum pump (7'). In such a case, the discharge pressure of the second water sealed vacuum pump can be enhanced by a degree of the difference H between the heights of the vacuum pumps, i.e., a pressure (rH, where r is the apparent specific gravity of water including foams) corresponding to the difference in water heads.

Meanwhile, in the example of FIG. 13, a first-stage vacuum pump (7) and a second-stage vacuum pump (8) are connected to series-connected two deaerator modules (1) and (2) via deaeration lines (10) and (15), respectively. Further, a suction port (7a) of an additional vacuum pump (7') as a sub pump is connected to a discharge line (19) of the first-stage vacuum pump (7) out of the foregoing pumps.

This configuration is such that the sub vacuum pump (7') as described for FIG. 12 is added to the combination of the deaerator modules (1), (2) and the vacuum pumps (7), (8) as described for the embodiment of FIG. 1. So its detailed description is omitted here. This embodiment has an effect in reducing the dissolved oxygen concentration in the water to a lower level.

FIG. 14 is a table in which the dissolved oxygen concentration of processed water is compared between a case (A) using the sub vacuum pump (7') as shown in FIGS. 12 and 13 and another (B) not using the sub vacuum pump (7'). From this table, it could be understood that the embodiment of the former (A) has achieved a vacuum pressure 20 times as high as that of the latter embodiment (B). Of course, as the number of the aforementioned sub vacuum pumps is increased, the deaeration performance is further improved.

A two-dot chain line (57) drawn in FIGS. 12 and 13 is an extraction line for extracting seal water from the main vacuum pump (7), showing that the extraction line may be provided as required. Reference numeral (58) denotes a seal water extraction pump. Such an extraction line (57) for seal water is useful when a sub vacuum pump (7') of relatively small capacity is used, in avoiding the possibility that the seal water from the main vacuum pump (7) becomes excessive in quantity so that excess pressure loss may take place. The excess seal water taken out by the extraction pump (58) is returned, for example, to the water reservoir (21) in the seal water circulation line (23), whereby it can be recycled. Besides, the excess seal water may also be supplied to the portion of the rotary shaft (not shown) of the sub vacuum pump (7'), in which way it can be utilized to enhance the sealing characteristic of the rotary shaft portion.

The membrane deaeration system according to the present invention comprises a combination of at least one deaerator module and one vacuum pump, as apparent from the foregoing description. It is also possible to provide a plurality of such combinations and automatically operate them.

The processing capacity of the deaerator is generally selected by taking into consideration the maximum quantity of water used depending on the season and the time band. Therefore, whereas a high operating efficiency is obtained when a large quantity of water is used, the operating efficiency would deteriorate when a small quantity of water is used, incurring losses of electric power, reduction in service life, and other problems. The larger the difference in the quantity of water used between when it is large and when small, the more noticeably such problems will appear.

An operating system (automatic number-of-unit control system) described below for a plurality of deaeration systems is to solve the aforementioned problems and is arranged so as to be able to control the number of units of the deaerator according to the quantity of water used.

Figure 15:
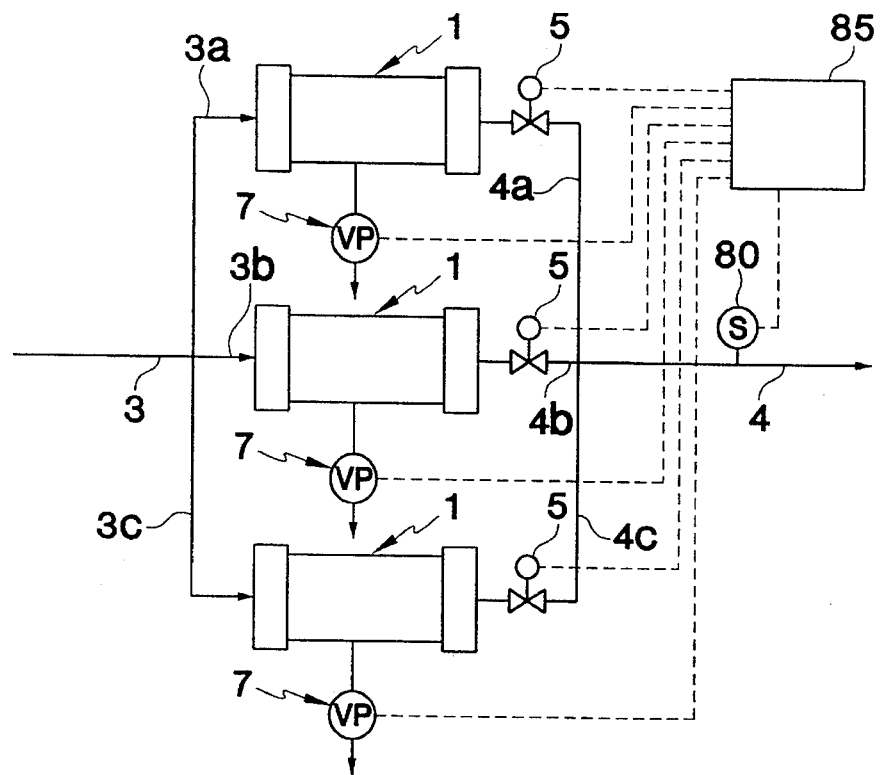
FIG. 15 is a piping system diagram showing an embodiment in which a plurality of deaeration systems formed from a combination of at least each one of the deaerator modules and one of the vacuum pumps are controlled for operation.
Figure 16:
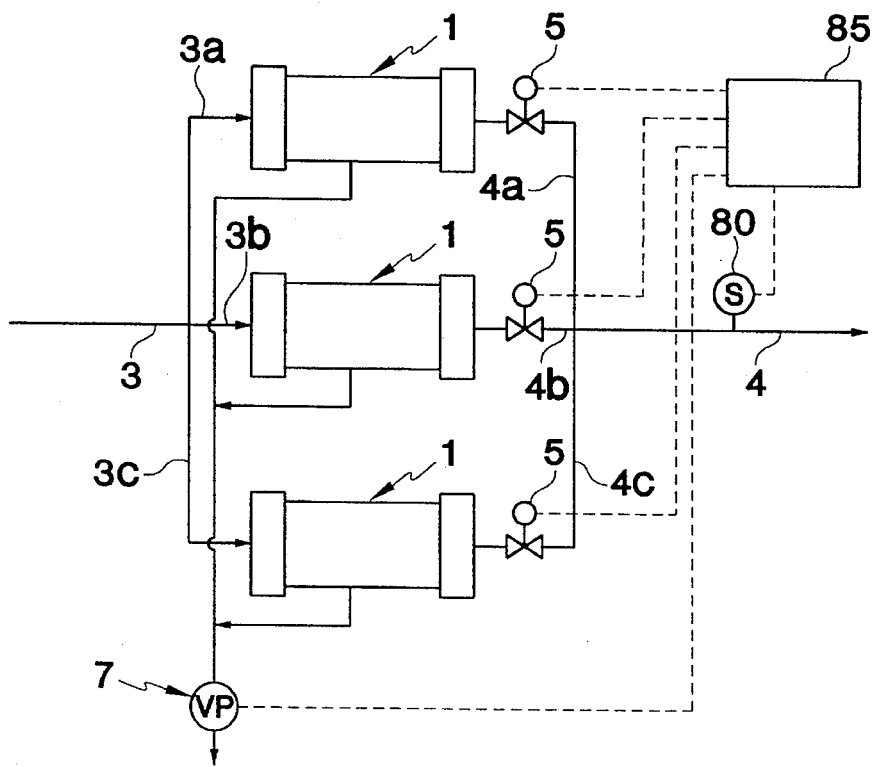
FIG. 16 is a similar diagram showing another embodiment in which a plurality of the deaerator modules are controlled for operation.
Figure 17:
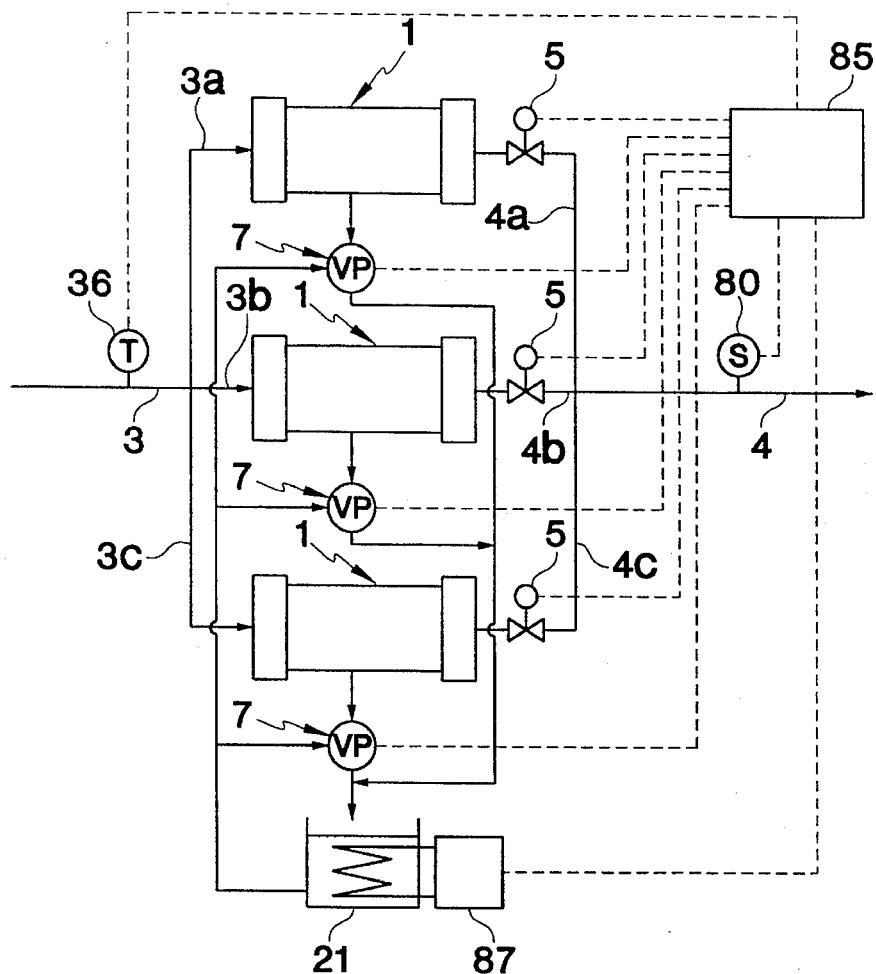
FIG. 17 is a similar diagram showing another modification in which a plurality of the deaeration systems are controlled for operation.

FIGS. 15 to 17 show embodiments in which three deaeration systems are arranged in parallel.

In the example of FIG. 15, a raw water supply line (3) is connected to an end of a deaerator module (1) via branch tubes (3a), (3b), (3c), while a deaeration water supply line (4) is connected to the other end via branch tubes (4a), (4b), (4c). Reference numeral (80) denotes a sensor for detecting the quantity of deaeration water used, the sensor being inserted, for example, in the supply line (4). This sensor (80) makes it possible to detect the pressure of water and convert it into the quantity of water used, instead of directly detecting the flow rate of water. This is based on the fact that there is a constant relation between the pressure of water and the quantity of water used and therefore the quantity of water used can be detected indirectly by measuring the pressure of water.

Figure 18:
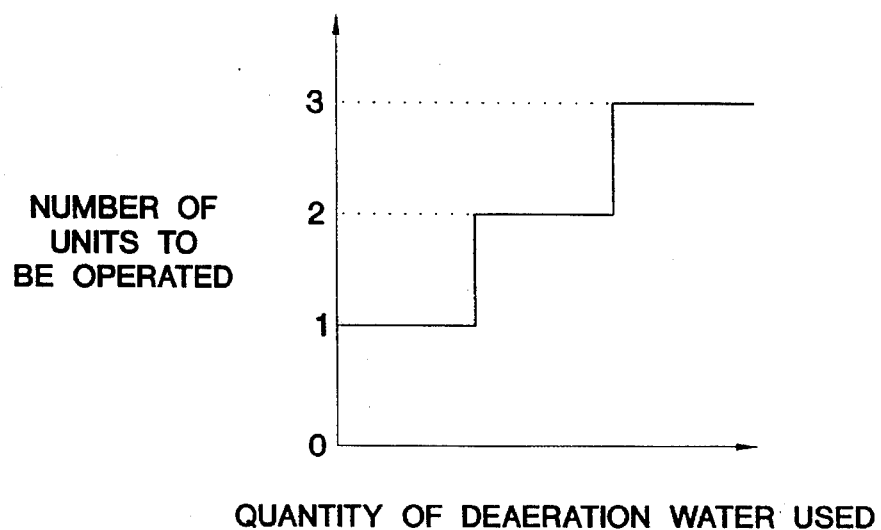
FIG. 18 is a graph showing previously set numbers of the deaeration systems to be put into operation according to the quantity of deaeration water used, as an index for determining the number of the deaeration systems to be operated.
Figure 19:
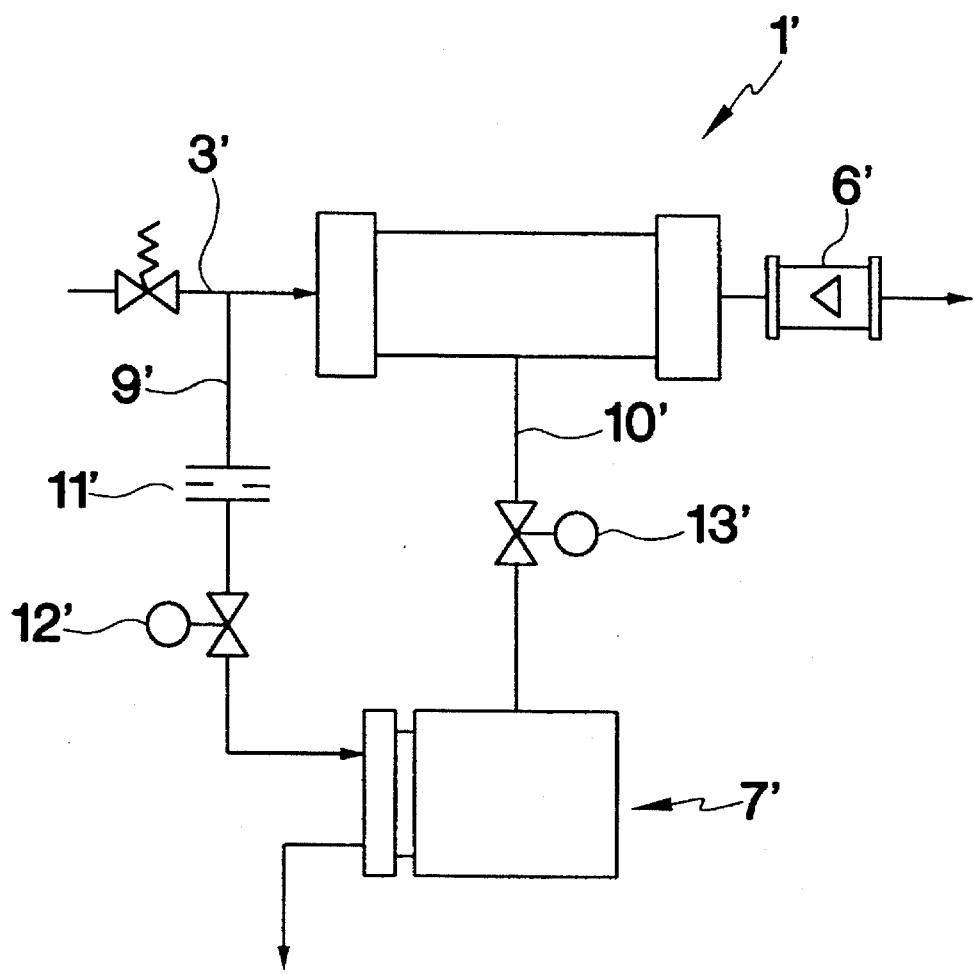
FIG. 19 is a piping system diagram showing an example of known membrane deaerators.

Reference numeral (85) denotes a controller for controlling the number of units, the controller having a function of controlling the number of units of the deaeration system to be operated, according to the value of an output signal from the sensor (80). This controller allows the opening/closing of each solenoid valve (5) and the ON/OFF control of the vacuum pump (7) according to the quantity of deaeration water used, whereby the number of units of the deaeration system to be operated is changed. As an index for determining the number of units for this control, it is desirable to previously set the number of units of the deaeration system to be operated, according to the quantity of deaeration water used as shown in FIG. 18. Although the vacuum pump (7) may be connected one to each deaerator module (1) as shown in FIG. 15, a single vacuum pump (7) common to those deaeration modules may be provided as shown in FIG. 16.

In the embodiment shown in FIG. 17, there are additionally provided a seal water temperature control means (87) for controlling the temperature of seal water of the vacuum pump (7), a deaeration water supply tank (21), and a temperature sensor (36). The arrangement and function of the circulation line including the seal water temperature control means (87) are substantially the same as those previously described.

By these embodiments of FIGS. 15 to 17, when deaeration systems (in a narrower sense, deaerators) provided in a number matching the quantity of deaeration water used are integrally and automatically controlled, the deaerators can be operated efficiently at all times so that the whole system can save energy and have a prolonged service life.

As apparent from the foregoing description, the membrane deaerator according to the present invention is useful in supplying deaeration water with dissolved oxygen concentration 0.1 PPM to several PPB or less, based on the combination of deaerator modules and vacuum pumps.

Deaeration water of such levels is applied as industrial water for boilers, water heaters, ice makers, and other cooling and heating equipment. In particular, deaerated water processed to around 10 PPB is effective as washing water for electronic parts such as LSIs. Also, the membrane deaerator of the present invention can be reduced in size and weight for its high deaeration performance. In brief, since the membrane deaerator can supply deaerated water of constant dissolved oxygen concentration even if the temperature of raw water varies, it may be applied also to water supply systems of buildings or the like and food processing equipment.

Further, when a plurality of the deaerators of the present invention are arranged to make up an automatic number-of-unit control system, the whole system can save energy and have a prolonged service life by operating the deaerators provided in a number matching the quantity of deaeration water used, efficiently at all times.

Otherwise, the deaerator of the present invention has advantages that the dissolved oxygen concentration can be easily controlled, and that the deaeration water of a controlled constant level can be supplied stably. Thus, the deaerator can be used instead of washing systems using washing agents such as chlorofluorocarbons, contributing to the suppression of damage of the ozone layer in air polluted regions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A membrane deaerator having a plurality of deaerator modules connected between a supply line for raw water and a supply line for deaeration water, comprising:

a first deaerator module connected to said supply line for raw water and located at a preceding stage;

a second deaerator module connected to said supply line for deaerating water and located at a succeeding stage and series-connected to the first deaerator module;

a first vacuum pump connected to the first deaerator module via a first deaeration line;

a second vacuum pump connected to the second deaerator module via a second deaeration line;

a discharge line for the second vacuum pump connected to the first deaeration line for the first vacuum pump so that discharge water from the second vacuum pump passes through the first vacuum pump and flows out through a discharge line thereof;

a plurality of seal water recirculation lines for circulating seal water through said first and second vacuum pumps, said seal water recirculation lines including a seal water supply line connected to each of the first and second vacuum pumps, and a seal water return line connected to the discharge line of the first vacuum pump;

a water reservoir connected to the seal water supply line and the seal water return line; and a reservoir water supply line for introducing deaerated water into said water reservoir which has passed through at least said first deaerator module.

2. A membrane deaerator having a plurality of deaerator modules connected between a supply line for raw water and a supply line for deaeration water, comprising:

a first deaerator module connected to said supply line for raw water and located at a preceding stage;

a second deaerator module connected to said supply line for deaeration water and located at a succeeding stage and series-connected to the first deaerator module to form one integral unit;

a first vacuum pump connected to the first deaerator module via a first deaeration line;

a second vacuum pump connected to the second deaerator module via a second deaeration line;

seal water supply lines for supplying raw water introduced through the supply line for raw water as seal water to the first and second vacuum pumps;

a circulation line for circulating the seal water through the first and second vacuum pumps;

cooling means for cooling the seal water flowing through the circulation line; and control means for controlling the operation of the cooling means.

3. The membrane deaerator according to claim 2, wherein a discharge line for said second vacuum pump is connected to said first deaeration line for said first vacuum pump so that discharge water from said second vacuum pump passes through said first vacuum pump and flows out through a discharge line thereof.

4. A membrane deaerator having a plurality of deaerator modules connected between a supply line for raw water and a supply line for deaeration water, comprising:

a first deaerator module connected to said supply line for raw water and located at a preceding stage;

a second deaerator module connected to said supply line for deaeration water and located at a succeeding stage and series-connected to the first deaerator module to form one integral unit;

a first vacuum pump connected to the first deaerator module via a first deaeration line;

a second vacuum pump connected to the second deaerator module via a second deaeration line;

seal water supply lines for supplying raw water introduced through the supply line for raw water as seal water to the first and second vacuum pumps;

heating means for heating the raw water provided upstream of the first deaerator module in the water supply line; and control means for controlling the operation of the heating means.

5. The membrane deaerator according to claim 4, wherein a discharge line for said second vacuum pump is connected to said first deaeration line for said first vacuum pump so that discharge water from said second vacuum pump passes through said first vacuum pump and flows out through a discharge line thereof.

6. A membrane deaerator for a deaeration system having at least one deaerator module connected between a raw water supply line for raw water and a deaeration water supply line for deaeration water, comprising:

a vacuum pump connected to the at least one deaerator module via a deaeration line;

a circulation line for circulating seal water through the vacuum pump;

a water reservoir for holding a quantity of said seal water;

a supply water takeout line interconnected between the raw water supply line and the water reservoir;

cooling means for cooling said seal water flowing along the circulation line to the vacuum pump;

a temperature sensor for detecting a temperature of the raw water within the raw water supply line;

a temperature sensor for detecting a temperature of said seal water within the circulation line; and control means for controlling the cooling means by discriminating signals from each of the temperature sensors.

7. A membrane deaerator for a deaeration system including a vacuum pump and at least one deaerator module connected between a raw water supply line for raw water and a deaeration water supply line for deaeration water, comprising:

a temperature sensor provided in the water supply line;

a feed pump provided in the water supply line upstream of the deaeration system;

a deaeration water supply tank provided downstream of the deaeration system and connected to said deaeration water supply line;

a water level detector for detecting a water level in the supply tank; and control means for controlling a flow rate of the feed pump by discriminating a signal output from the temperature sensor.

8. A membrane deaerator for a deaeration system having at least one deaerator module connected between a raw water supply line for raw water and a deaeration water supply line for deaeration water, comprising:

a first vacuum pump having an input connected to the deaerator module via a deaeration line; and a second vacuum pump having an input connected to an output of the first vacuum pump.

9. The membrane deaerator according to claim 8, and further comprising:

means for providing seal water to said first vacuum pump; and an extraction line for extracting the seal water from said first vacuum pump.

10. A membrane deaerator having a plurality of deaerator modules connected between a supply line for raw water and a supply line for deaeration water, comprising:

a first deaerator module connected to said supply line for raw water and located at a preceding stage;

a second deaerator module connected to said supply line for deaeration water and located at a succeeding stage and series-connected to the first deaerator module;

a first vacuum pump connected to the first deaerator module via a first deaeration line;

a second vacuum pump connected to the second deaerator module via a second deaeration line;

a discharge line for the second vacuum pump connected to the first deaeration line and to the first vacuum pump; and a third vacuum pump having a deaeration port;

wherein the first vacuum pump includes a discharge line connected to the deaeration port of the third vacuum pump.

11. A membrane deaerator in which a deaeration system including a vacuum pump and a deaerator module is connected between a raw water supply line for raw water and a deaerated water supply line for deaeration water, comprising:

a plurality of deaerator modules arranged in parallel;

a plurality of solenoid valves for controlling water flow in each of said plurality of deaerator modules;

a flow rate sensor provided in the deaerated water supply line; and a controller for controlling a number of deaerator modules to be operated, by actuating selected ones of said solenoid valves depending on a signal provided by said flow rate sensor indicating a quantity of deaeration water used.

* * * * *